United States Patent
Kumar

(10) Patent No.: US 8,982,924 B2
(45) Date of Patent: Mar. 17, 2015

(54) ARCHITECTURES AND METHODS FOR CODE COMBINERS

(75) Inventor: Rajendra Kumar, Cerritos, CA (US)

(73) Assignee: The Aerospace Corporation, El Segundo, CA (US)

( * ) Notice: Subject to any disclaimer, the term of this patent is extended or adjusted under 35 U.S.C. 154(b) by 833 days.

(21) Appl. No.: 12/660,615

(22) Filed: Mar. 2, 2010

(65) Prior Publication Data

US 2011/0216852 A1    Sep. 8, 2011

(51) Int. Cl.
*H04B 1/00* (2006.01)
*G06F 7/00* (2006.01)
*H04L 27/00* (2006.01)
*H04L 27/20* (2006.01)

(52) U.S. Cl.
CPC  *G06F 7/00* (2013.01); *H04L 27/00* (2013.01); *H04L 27/20* (2013.01)
USPC ........... 375/130; 375/131; 375/260; 375/343; 375/367; 327/164; 455/42; 455/43; 455/44; 455/45

(58) Field of Classification Search
CPC ........................ H04N 21/4382; H04N 21/2383
See application file for complete search history.

(56) References Cited

U.S. PATENT DOCUMENTS

| | | | |
|---|---|---|---|
| 6,850,649 B1 * | 2/2005 | Malvar | 382/240 |
| 7,161,895 B1 * | 1/2007 | Sudo | 370/204 |
| 2002/0075907 A1 * | 6/2002 | Cangiani et al. | 370/535 |
| 2002/0090024 A1 * | 7/2002 | Tan | 375/146 |
| 2002/0150068 A1 * | 10/2002 | Orr et al. | 370/335 |
| 2003/0235238 A1 * | 12/2003 | Schelm et al. | 375/148 |

FOREIGN PATENT DOCUMENTS

| | | |
|---|---|---|
| EP | 1334595 B1 | 12/2004 |
| WO | WO 02/069516 A1 | 9/2002 |

OTHER PUBLICATIONS

J.J. Spilker Jr. and R.S. Orr, Code Multiplexing Via Majority Logic for GPS Modernization, ION GPS 1998, Sep. 15-18, 1998, Nashville.
A. Qureshi and R. Kumar, "System Optimization with Active Power Control During High Traffic in CDMA," Proc. 1999 IEEE Radio and Wireless Conf., Denver, Colorado, Aug. 1-4, 1999, pp. 93-97.
D. Boudreau et al., "Wideband CDMA for the UMTS/IMT-2000 Satellite Component," IEEE Transactions on Vehicular Technology, vol. 51, No. 2, Mar. 2000, pp. 306-331.
G. E. Corazza and C. Caini, "Satellite Diversity Exploitation in Mobile Satellite CDMA Systems," IEEE Wireless Communication and Networking Conf. (WCNC '99), New Orleans, LA, Sep. 21-24, 1999, pp. 1203-1207.

(Continued)

*Primary Examiner* — Shuwang Liu
*Assistant Examiner* — Gina McKie
(74) *Attorney, Agent, or Firm* — K&L Gates LLP

(57) ABSTRACT

Various embodiments are directed to systems and methods for combining a plurality of codes. The plurality of codes may be binary codes having possible logical values of −1 and +1 and may comprise an even number of codes. An output of the combining $v_{o,k}$ may be given by:

$$v_o = \text{sgn}(v_i),$$

where $v_i$ is the sum of the first plurality of codes at the first time. Embodiments for allocating different power levels among various codes are presented.

19 Claims, 6 Drawing Sheets

(56) References Cited

OTHER PUBLICATIONS

R. Kumar and R. Martinez, "CDMA Satellite System Capacity with Multi-User Classes," 2006 AIAA International Communication Satellites Systems Conference, San Diego, California, Jun. 11-14, 2006.
R. De Gaudenzi and A. Silberger, "Payload Non Linearity Effects on the Globalstar Forward Link," IEEE ICUPC'97, Chicago, IL, Oct. 1997, pp. 311-315.
A. Silberger, "The Effect of Nonlinear Amplifiers on Orthogonal-CDMA Link and Measures of Performance, Using a Simplified Amplifier Model," IEEE ICUP'97, Chicago, IL, Oct. 1997, pp. 521-524.
A. Conti, D. Dardari, and V, Tralli, "An Analytical Framework for CDMA System with a Nonlinear Amplifier and AWGN," IEEE Transactions on Communications, vol. 50, No. 7, Jul. 2002, pp. 1110-1120.
R. Kumar, "An Analysis of the Distortion Effects of Nonlinear Amplifier on CDMA Signals" Proc. IEEE Aero Conf., Mar. 2007, Big Sky, Montana.
R. Kumar, "A High-Order Analysis of the Distortion Effects of Nonlinear Amplifiers on CDMA Signals," Proc. IEEE Aero Conf., Mar. 2008, Big Sky. Montana.
R. Kumar, "A High-Order Analysis of the Distortion Effects of Nonlinear Amplifier on QPSK-Modulationed CDMA Signals," Proc. AIAA International Communication Satellite Systems Conference, Jun. 2008, Big Sky, Montana.
Navstar GPS Space Segment/Navigation User Interfaces, Doc. IS-GPS-200, Revision D. GPS Joint Program Office, El Seguno, California, Mar. 2006.
Navstar GPS Space Segment/User Segment L5 interfaces, Draft IS-GPS-705, GPS Joint Program Office, El Segundo, California, Sep. 2005.
Naystar GPS Space Segment/User Segment L1C interfaces, Draft IS-GPS-800, Global Positioning Systems Wing Headquarters, El Segundo, California, Oct. 2006.

* cited by examiner

ARCHITECTURES AND METHODS FOR CODE COMBINERS

STATEMENT OF GOVERNMENT INTEREST

This invention was made with government support under Contract No. FA8802-09-C-0001 awarded by the Department of the United States Air Force. The government has certain rights in the invention.

BACKGROUND

Code division multiple access (CDMA) modulation techniques are used in various communications fields to allow multiple access (i.e., multiple data signals to be transmitted on a single channel). According to CDMA, each data signal is modulated with a pseudo-random code having a wider bandwidth than the data signal. The result is a spread-spectrum user signal or code. Different data signals to be transmitted on the same channel may utilize different pseudo-random codes. A receiver of a particular data signal may either have or may derive the pseudo-random code with which its respective data signal was modulated. The receiver may utilize the appropriate pseudo-random code to demodulate the user signal or code and derive the original data signal. User signals or codes modulated by pseudo-random codes not known to the receiver will appear as noise.

It is often desirable to amplify a CDMA signal composed of many individual user signals or codes (e.g., to transmit the signal). For example, a global positioning system (GPS) satellite may transmit a combination of multiple GPS signals. Also, for example, a mobile telephone base station may transmit a combination of multiple CDMA signals corresponding to different conversations or other data transactions. In many applications, highly linearized power amplifiers (LPA's) may be used to amplify signals comprising a combination of codes. LPA's generate an output signal with minimal distortion, however, suffer from poor power efficiency. When a higher power efficiency is required, high-power nonlinear power amplifiers (HPA's) may be used. HPA's, however, generate a large number of distortion terms that are present, along with the input signal, at the amplifier output. In addition, there is some loss in the signal power as a component of the amplifier output power is used up by the distortion terms. It is possible to minimize the distortion terms and associated output power loss by configuring the HPA with a larger output power back-off. This, however, also reduces DC-RF power conversion efficiency.

It is known to reduce HPA distortion by pre-combining CDMA codes prior to amplification according to a majority logic scheme. A majority logic combiner counts the number of codes at its input that have a value of +1 and −1 during any chip period. The output is set to which ever value (e.g., +1 or −1) occurs in a majority of the signals. Where M is the number of codes to be combined, the output of a majority logic combiner at any time k may be equal to +1 if the number of codes that take the value +1 is greater than or equal to (M+1)/2 and is equal to −1 otherwise. For example, Table 1 below shows a chart illustrating the output ($v_0$) of a majority logic combiner operating on three input codes ($c_1$, $c_2$, $c_3$):

TABLE 1

| Majority Logic Combiner Output | | | | | | | | |
|---|---|---|---|---|---|---|---|---|
| $c_1$ | −1 | −1 | −1 | −1 | +1 | +1 | +1 | +1 |
| $c_2$ | −1 | −1 | +1 | +1 | −1 | −1 | +1 | +1 |
| $c_3$ | −1 | +1 | −1 | +1 | −1 | +1 | −1 | +1 |
| $v_0$ | −1 | −1 | −1 | +1 | −1 | +1 | +1 | +1 |

TABLE 1-continued

The output ($v_0$) may be provided to an HPA amplifier. Note that in a majority logic combiner, M must be odd to avoid the occurrence of a tie.

Majority logic combining may allow HPA amplifiers to operate more effectively, however, the majority logic combining process itself may introduce distortion terms, which can be amplified by the HPA, leading to signal degradation.

SUMMARY

Various embodiments are directed to signum code combiners that combine a plurality of codes and have three possible logical outputs, +1, −1 and 0. For example, the output of the signum combiner may be +1 if the sum of the input signals is greater than zero; −1 if the sum of the input signals is less than zero and zero if the sum of the input signals is equal to zero. Various embodiments are also directed to signum combiners have various additional features including, for example, successive signal insertion signum combiners, signum combiners with interlacing, and weighted coefficient signum combiners. Various embodiments may also be directed to modulators for modulating signum combiner outputs according to any suitable modulation scheme including, for example, binary phase shift keying (BPSK) modulation and quadrature phase shift keying (QPSK) modulation.

DRAWINGS

Various embodiments of the present invention are described here by way of example in conjunction with the following figures, wherein.

DESCRIPTION

Figure 1:
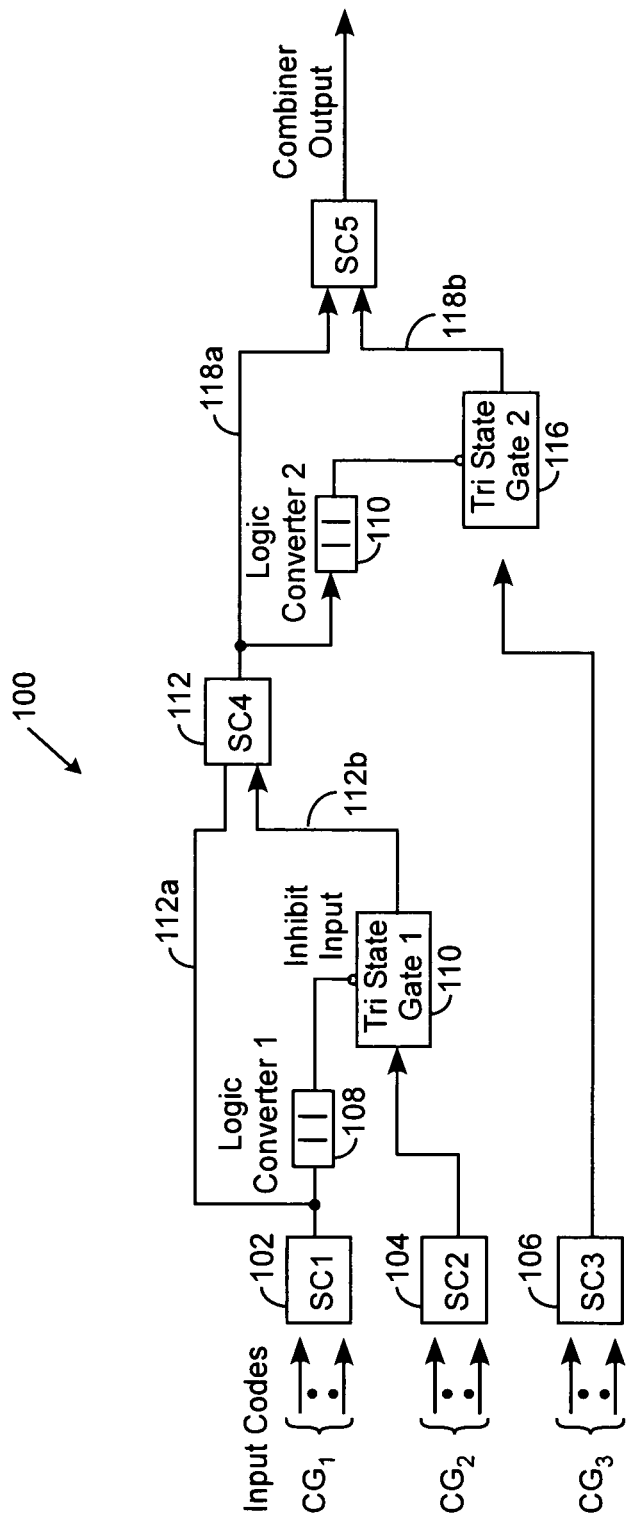
FIG. 1 illustrates one embodiment of an architecture for utilizing a cascaded set of signum combiners to combine code groups of differing power.

Various embodiments are directed to signum code combiners that may decrease distortion and increase power efficiency and increase the number of potential output levels from two to three. For example, a signum combiner may generate an output according to (1) and (2) below, where $c_{i,k}$, for i=1 to M represents the value of M input codes during a period k. The period k may be a chip period or other period indicating one cycle of the input codes.

$$v_{i,k} = c_{1,k} + c_{2,k} + \ldots + c_{M,k} \quad (1)$$

$$v_{0,k} = \text{sgn}(v_{i,k}) \quad (2)$$

The signum function is given by (3);

$$\mathrm{sgn}(x) = \begin{cases} 1; & x > 0 \\ 0; & x = 0 \\ -1; & x < 0 \end{cases} \quad (3)$$

In (1) and (2), $v_{i,k}$ is the sum of the M input codes for a chip period k and $v_{0,k}$ is the output for the chip period k. According to various embodiments, the signum combiner given by (1) and (2) may accept an even or an odd number of input codes M. When the number of input codes M is an odd number, the output of the signum combiner may be identical to that of a majority logic combiner, with only two possible logical outputs (+1 and −1). Accordingly, the distortion and power efficiency properties may also be the same. When the number of input codes is even, three logical outputs (+1, 0, −1) may be possible and, as demonstrated below, improvements in distortion and power efficiency may be realized. Table 2 illustrates a signum combiner output where the number of input codes M is four:

TABLE 2

Signum Combiner (M = 4)

| $C_1$ | −1 | −1 | −1 | −1 | −1 | −1 | −1 | −1 | +1 | +1 | +1 | +1 | +1 | +1 | +1 | +1 |
|---|---|---|---|---|---|---|---|---|---|---|---|---|---|---|---|---|
| $C_2$ | −1 | −1 | −1 | −1 | +1 | +1 | +1 | +1 | −1 | −1 | −1 | −1 | +1 | +1 | +1 | +1 |
| $C_3$ | −1 | −1 | +1 | +1 | −1 | −1 | +1 | +1 | −1 | −1 | +1 | +1 | −1 | −1 | +1 | +1 |
| $C_4$ | −1 | +1 | −1 | +1 | −1 | +1 | −1 | +1 | −1 | +1 | −1 | +1 | −1 | +1 | −1 | +1 |
| $V_0$ | −1 | −1 | −1 | 0 | −1 | 0 | 0 | +1 | −1 | 0 | 0 | +1 | 0 | +1 | +1 | +1 |

When the number of input codes is even, a signum combiner may enjoy a reduction in distortion and an increase in power efficiency relative to a majority logic combiner. Before finding the distortion characteristics of a signum combiner, however, an analysis of the distortion characteristics of a majority logic combiner is first derived for comparison purposes.

In general, the output of the majority logic code combiner will have some positive cross correlation with all of the input codes representing the signal component as well as a distortion term that has zero cross correlation with all of the input codes. The amplitudes and powers of the various components may be obtained by cross-correlating the output with the input codes and the distortion terms of various orders. For example, where the number of codes M is equal to three, the output will have only the components of the input codes and the third order distortion term. Table 3 below shows the logic relationships between the input codes ($c_1$, $c_2$, $c_3$), the output ($X_2=v_0$); and the third order distortion term equal to the product of $c_1$, $c_2$, $c_3$ and $v_0$.

TABLE 3

Logic relationships between the majority logic combiner output and various terms

| $c_1$ | $c_2$ | $c_3$ | $X_1 = c_1 c_2 c_3$ | $X_2 = v_0$ | $X_1 X_2$ |
|---|---|---|---|---|---|
| −1 | −1 | −1 | −1 | −1 | 1 |
| 1 | −1 | −1 | 1 | −1 | −1 |
| −1 | 1 | −1 | 1 | −1 | −1 |
| 1 | 1 | −1 | −1 | 1 | −1 |
| −1 | −1 | 1 | 1 | −1 | −1 |

TABLE 3-continued

Logic relationships between the majority logic combiner output and various terms

| $c_1$ | $c_2$ | $c_3$ | $X_1 = c_1 c_2 c_3$ | $X_2 = v_0$ | $X_1 X_2$ |
|---|---|---|---|---|---|
| 1 | −1 | 1 | −1 | 1 | −1 |
| −1 | 1 | 1 | −1 | 1 | −1 |
| 1 | 1 | 1 | 1 | 1 | 1 |

Table 3 shows values for a single chip period. For convenience, therefore, the time index k is omitted from the code sequence $c_{j,k}$. Because the codes are assumed to be random, all eight possible combinations of the input code symbols ($c_1$, $c_2$, $c_3$) are assumed to be equally likely. Therefore, the normalized cross correlation between the output $v_0$ and various terms may be obtained by element wise multiplication of the corresponding elements, summing these terms and dividing by the norm square of any particular column, which in this case, is eight. Accordingly, the cross correlations, denoted by the symbol < >, are given below:

$$<v_0,c_1>=[1-1+1+1+1+1-1+1]/8=0.5 \quad (4a)$$

$$<v_0,c_2>=0.5; <v_0,c_3>=0.5 \quad (4b)$$

$$<v_0,X_1>=[1-1-1-1-1-1-1+1]/8=-0.5 \quad (4c)$$

To derive a closed form expression for the more general case of M terms, it may be observed from Table 3 that:
(5) $X_1=1$ if the number of 1's is either 1 or 3
$X_1=-1$ if the number of 1's is either 0 or 2
(6) $X_2=1$ if the number of 1's is either 2 or 3
$X_2=-1$ if the number of 1's is either 0 or 1
Accordingly,
(7) $X_1=1$ & $X_2=1$ if the number of 1's is 3
$X_1=-1$ & $X_2=-1$ if the number of 1's is 0
Therefore, $X_1 \cdot X_2=1$ if and only if the number of 1's is either 0 or 3. The number of code combinations for which the total number of 1's is equal to 0 and 3 is equal to:

$$\binom{3}{0} = 1; \quad (8)$$

and $$\binom{3}{3} = 1 \quad (9)$$

Thus, $X_1 \cdot X_2=1$ for 2 of the 8 possible code combinations, and is otherwise equal to −1. From this, it may be inferred that $E[X_1 \cdot X_2]=[(1)\cdot(2)+(-1)\cdot(6)]/8=-0.5$, which is the same as obtained by more direct computations in (4c).

In a more general case of M codes, the $n^{th}$ order term may be given by:

$$(n \text{ odd}) X_1 = c_{i_1} \cdot c_{i_2} \ldots c_{i_n} \qquad (10)$$

The indices $i_1, i_2, \ldots i_n$ are all distinct and may take values between 1 and M. In this case, $X_1 = +1$ if the number of +1's within the subsequence $c_{i_1}, c_{i_2}, \ldots c_{i_n}$ is an odd integer and $X_1 = -1$ if the number of −1's in the subsequence $c_{i_1}, c_{i_2}, \ldots, c_{i_n}$ is an even integer. Similarly, $X_2 = +1$ if the number of +1's in the complete code sequence is greater than M/2 and $X_2 = -1$ if the number of 1's in the complete code sequence is less than M/2. With the order n of the term odd, the number of terms $I_1$ for which $X_1 = 1$ and $X_2 = 1$ is given by:

$$I_1 = \binom{n}{1} \sum_{i=\lceil M/2 \rceil - 1}^{M-n} \binom{M-n}{i} + \binom{n}{3} \sum_{i=\lceil M/2 \rceil - 3}^{M-n} \binom{M-n}{i} + \ldots + \binom{n}{n} \sum_{i=\lceil M/2 \rceil - n}^{M-n} \binom{M-n}{i} \qquad (11)$$

$$= \sum_{\substack{k=1 \\ k:\text{odd}}}^{n} \binom{n}{k} \sum_{i=\lceil M/2 \rceil - k}^{M-n} \binom{M-n}{i}$$

In (11) and in all of the following equations, $$\binom{N}{m} = 0 \text{ if } m < 0 \text{ or } m > M \text{ or } N < 0$$

by convention and the notation $\lceil x \rceil$ denotes the minimum integer that is greater than or equal to x for any real x. Similarly, the number of terms $I_2$ for which $X_1 = -1$ and $X_2 = -1$ is given by:

$$I_2 = \binom{n}{0} \sum_{i=0}^{\lfloor M/2 \rfloor} \binom{M-n}{i} + \binom{n}{2} \sum_{i=0}^{\lfloor M/2 \rfloor - 1} \binom{M-n}{i} + \ldots + \binom{n}{n-1} \sum_{i=0}^{\lfloor M/2 \rfloor - (n-1)} \binom{M-n}{i} \qquad (12)$$

$$= \sum_{\substack{k=0 \\ k:\text{even}}}^{n-1} \binom{n}{k} \sum_{i=0}^{\lfloor M/2 \rfloor - k} \binom{M-n}{i}$$

In (12) the notation $\lfloor x \rfloor$ denotes the maximum integer that is less than or equal to x for any real x. As the total number of terms (e.g., possible sequences) is $2^M$, the expected value of $X_1 X_2$ is given by:

$$E[X_1 X_2] = 1 \cdot \frac{(I_1 + I_2)}{2^M} + (-1) \cdot \left[1 - \frac{(I_1 + I_2)}{2^M}\right] \qquad (13)$$

Or $$E[X_1 X_2] = \frac{2(I_1 + I_2)}{2^M} - 1 \qquad (14)$$

Equations (15a)-(15c) below illustrate an example realization of Equations (11)-(14) above for the case where M=5 and n=3.

$$I_1 = \binom{3}{1} \sum_{i=2}^{2} \binom{2}{i} + \binom{3}{3} \sum_{i=0}^{2} \binom{2}{i} = 7 \qquad (15a)$$

$$I_2 = \binom{3}{0} \sum_{i=0}^{2} \binom{2}{i} + \binom{3}{2} \sum_{i=0}^{0} \binom{2}{i} = 7 \qquad (15b)$$

$$E[X_1 X_2] = \frac{2(14)}{32} - 1 = -1/8 \qquad (15c)$$

In (15a)-(15c), $\lceil M/2 \rceil = 3$. The number of terms of order n of the type $X_1$ given by (10) at the output of the code combiner is given by $$t_n = \binom{M}{n}.$$

Table 4 below provides the number of terms $t_n$, the amplitude of the terms $a_n$, and the total power $P_n$ in all the terms of order n, for M taking odd integer values between 3 and 9. The terms corresponding to n=1, of course, are the signal terms while all the other terms are the distortion terms.

TABLE 4

The number of distortion terms and their amplitudes and powers

M = 3

| N | 1 | 3 |  |  |
|---|---|---|---|---|
| $t_n$ | 3 | 1 |  |  |
| $a_n$ | 0.5 | −0.5 |  |  |
| $P_n$ | 0.75 | 0.25 |  |  |

M = 5

| N | 1 | 3 | 5 |  |  |
|---|---|---|---|---|---|
| $t_n$ | 5 | 10 | 1 |  |  |
| $a_n$ | 0.375 | −0.125 | 0.375 |  |  |
| $P_n$ | 0.7031 | 0.1563 | 0.1406 |  |  |

M = 7

| N | 1 | 3 | 5 | 7 |  |
|---|---|---|---|---|---|
| $t_n$ | 7 | 35 | 21 | 1 |  |
| $a_n$ | 0.3125 | −0.0625 | 0.0625 | −0.3125 |  |
| $P_n$ | 0.6836 | 0.1367 | 0.0820 | 0.0977 |  |

M = 9

| N | 1 | 3 | 5 | 7 | 9 |
|---|---|---|---|---|---|
| $t_n$ | 9 | 84 | 126 | 36 | 1 |
| $a_n$ | 0.2734 | −0.0391 | 0.0234 | −0.0391 | 0.2734 |
| $P_n$ | 0.6729 | 0.1282 | 0.0692 | 0.0549 | 0.0748 |

Table 5 shows the signal power to distortion ratio γ in dB obtained by dividing $P_1$ of Table 4 by the sum of power in all the distortion terms present at the output and represented by $P_n$ with n>1.

TABLE 5

Performance of the Majority Logic Combiner

| M | $P_s$ (W) | $P_t$ (W) | $P_L$ (dB) | γ (dB) |
|---|---|---|---|---|
| 3 | 0.75 | 1.0 | 1.25 | 4.77 |
| 5 | 0.7031 | 1.0 | 1.53 | 3.74 |
| 7 | 0.6836 | 1.0 | 1.65 | 3.34 |
| 9 | 0.6729 | 1.0 | 1.72 | 3.13 |

As illustrated by Table 5, for the existing majority logic combiners, the maximum amount of power $P_s$ corresponding to the signal is 75% of the total power, with the maximum possible power to distortion ratio being 4.77 dB, this for the case where M=3. This ratio decreases further as the number of codes M is increased. Implicitly, the cross-correlation properties of the codes are modified due to the presence of the distortion terms, leading to the degradation of receiver acquisition and tracking performance.

With the distortion performance of the existing majority logic combiners as a baseline, the distortion of a signum combiner with an even number of input codes may be found in a manner similar to that described above with respect to the majority logic combiner. As with the analysis of the majority logic converter above, $c_{i_1}, c_{i_2}, \ldots, c_{i_n}$ may represent the input codes, $X_2$ may represent the output $v_0$ and $X_1$ may represent a distortion of term of order n (n odd).

Given (2) above, the output $X_2$ may be given by (16a)-(16c) below:

(16a) $X_2=1$ if the number of 1's in the complete input sequence>M/2

(16b) $X_2=-1$ if the number of 1's in the complete input sequence<M/2

(16c) $X_2=0$ if the number of 1's in the complete input sequence=M/2

The distortion term $X_1$ may be given by (17):

$$X1 = c_{i_1} \cdot c_{i_2} \ldots c_{i_n} \qquad (17)$$

In (17), the indices $i_1, i_2, \ldots, i_n$ are all distinct and may take values between 1 and M. This is in view of the fact that the terms for which $i_1, i_2, \ldots, i_n$ are not all distinct may reduce to terms of lower order with distinct indices due to the property that $c_{i,k}^2=1$ for all code indices i and time k. Accordingly:

(18) $X_1=1$ if the number of 1's within the subsequence $c_{i_1}, c_{i_2}, \ldots, c_{i_n}$ is an odd integer

(19) $X_1=-1$ if the number of 1's within the subsequence $c_{i_1}, c_{i_2}, \ldots, c_{i_n}$ is an even integer Because the signum function has odd symmetry, only terms of odd order n may be present at the output. Accordingly, the number of terms for which $X_1$ and $X_2=1$ is given by (20):

$$I_1 = \binom{n}{1} \sum_{i=M/2}^{M-n} \binom{M-n}{i} + \binom{n}{3} \sum_{i=M/2-2}^{M-n} \binom{M-n}{i} + \ldots + \qquad (20)$$

$$\binom{n}{n} \sum_{i=M/2-n+1}^{M-n} \binom{M-n}{i}$$

$$= \sum_{\substack{k=1 \\ k:odd}}^{n} \binom{n}{k} \sum_{i=\max(M_1-k,0)}^{M-n} \binom{M-n}{i};$$

$$M_1 = M/2 + 1$$

Similarly, the number of terms $I_2$ for which $X_1=-1$ and $X_2=-1$ is given by (20a):

$$I_2 = \binom{n}{0} \sum_{i=0}^{M/2-1} \binom{M-n}{i} + \binom{n}{2} \sum_{i=0}^{M/2-3} \binom{M-n}{i} + \ldots + \qquad (20a)$$

$$\binom{n}{n-1} \sum_{i=0}^{M/2-n} \binom{M-n}{i}$$

$$= \sum_{\substack{k=0 \\ k:even}}^{n} \binom{n}{k} \sum_{i=0}^{M/2-1-k} \binom{M-n}{i}$$

The number of terms $I_3$ for which $X_1=1$ and $X_2=-1$ is given by (21):

$$I_3 = \binom{n}{1} \sum_{i=0}^{M/2-2} \binom{M-n}{i} + \binom{n}{3} \sum_{i=0}^{M/2-4} \binom{M-n}{i} + \ldots + \qquad (21)$$

$$\binom{n}{n} \sum_{i=0}^{M/2-1-n} \binom{M-n}{i}$$

$$= \sum_{\substack{k=1 \\ k:odd}}^{n} \binom{n}{k} \sum_{i=0}^{M/2-1-k} \binom{M-n}{i}$$

Finally, the number of terms $I_4$ for which $X_1=-1$ and $X_2=1$ is given by (22):

$$I_4 = \binom{n}{0} \sum_{i=M/2+1}^{M-n} \binom{M-n}{i} + \binom{n}{2} \sum_{i=M/2+1-2}^{M-n} \binom{M-n}{i} + \ldots + \qquad (22)$$

$$\binom{n}{n-1} \sum_{i=M/2-n+2}^{M-n} \binom{M-n}{i}$$

$$= \sum_{\substack{k=0 \\ k:even}}^{n-1} \binom{n}{k} \sum_{i=M/2+1-k}^{M-n} \binom{M-n}{i}$$

The cross-correlation between $X_1$ and $X_2$ may be given by (23):

$$E[X_1 X_2] = \{(1) \cdot (I_1 + I_2) + (-1) \cdot (I_3 + I_4)\}/2^M \qquad (23)$$

Equation (23) may be derived by observing that there are total of terms and for all the remaining terms not accounted for in $I_1, I_2, I_3,$ and $I_4$ the product $X_1 X_2=0$. Table 6 shows the distortion terms and amplitudes thereof for one embodiment of a signum combiner for different values of M.

TABLE 6

The number of distortion terms and their amplitudes and powers (M even)

| M = 4 | | |
|---|---|---|
| n | 1 | 3 |
| $t_n$ | 4 | 4 |
| $a_n$ | 0.375 | −0.125 |
| $P_n$ | 0.5625 | 0.0625 |

| M = 6 | | |
|---|---|---|
| n | 1 | 3 | 5 |
| $t_n$ | 6 | 20 | 6 |
| $a_n$ | 0.3125 | −0.0625 | 0.0625 |
| $P_n$ | 0.5859 | 0.0781 | 0.0234 |

TABLE 6-continued

The number of distortion terms and their amplitudes
and powers (M even)

M = 8

| n | 1 | 3 | 5 | 7 | | |
|---|---|---|---|---|---|---|
| $t_n$ | 8 | 56 | 56 | 8 | | |
| $a_n$ | 0.2734 | −0.0391 | 0.0234 | −0.0391 | | |
| $P_n$ | 0.5981 | 0.0854 | 0.0308 | 0.0122 | | |

M = 10

| n | 1 | 3 | 5 | 7 | 9 | |
|---|---|---|---|---|---|---|
| $t_n$ | 10 | 120 | 252 | 120 | 10 | |
| $a_n$ | 0.2461 | −0.0273 | 0.0117 | −0.0117 | 0.0273 | |
| $P_n$ | 0.6056 | 0.897 | 0.0346 | 0.0165 | 0.0075 | |

M = 12

| n | 1 | 3 | 5 | 7 | 9 | 11 |
|---|---|---|---|---|---|---|
| $t_n$ | 12 | 220 | 792 | 792 | 220 | 12 |
| $a_n$ | 0.2256 | −0.0205 | 0.0068 | −0.0049 | 0.0068 | −0.0205 |
| $P_n$ | 0.6107 | 0.0925 | 0.0370 | 0.0189 | 0.0103 | 0.0050 |

Table 7 shows the signum combiner signal power $P_s$ equal to $P_1$ in Table 6, the total output power $P_t$ equal to sum of $P_n$ over n, the loss in power equal to $P_L = 10 \log(P_t/P_s)$ dB and the signal to distortion ratio $\gamma = 10 \log(P_s/(P_t - P_s))$ dB for various values of M.

TABLE 7

Performance of the Signum Combiner

| M | $P_s$ (W) | $P_t$ (W) | $P_L$ (dB) | γ (dB) |
|---|---|---|---|---|
| 4 | 0.5625 | 0.625 | 0.46 | 9.54 |
| 6 | 0.5859 | 0.6875 | 0.69 | 7.61 |
| 8 | 0.5981 | 0.7266 | 0.84 | 6.68 |
| 10 | 0.6056 | 0.7539 | 1.23 | 6.11 |
| 12 | 0.6107 | 0.7744 | 1.11 | 5.7 |
| 16 | 0.617 | 0.8036 | 1.14 | 5.19 |
| 32 | 0.6268 | 0.8601 | 1.37 | 4.29 |
| 64 | 0.6317 | 0.9007 | 1.54 | 3.7 |

A comparison of Table 7 with Table 5 above demonstrates that the signum combiner provides an improved signal to distortion ratio (SDR) and power efficiency over the majority logic combiner. For example, for M=4 codes, the signum combiner has an SDR γ of 9.54 dB. The majority logic combiner has an SDR γ of 4.77 dB when M=3 and an SDR γ of 3.74 dB for M=5. The average SDR γ of the majority logic combiner between the case where M=3 and the case where M=5 is 4.25 dB. Compared with the SDR γ for the signum combiner when M=4, this represents an improvement of more than 5 dB. Also, the power loss to distortion $P_L$ of the signum combiner when M=4 is equal to 0.46 dB, compared with majority logic combiner's 1.39 dB average between the M=3 and M=5 cases. Similarly, the power efficiency, defined as the ratio of $P_s$ and $P_t$ is equal to 90% with M=4 for the sigma combiner compared to 72.5% average for M=3 and M=5 for the majority logic combiner. As the power conversion efficiency of the high-power non-linear amplifier (HPA) with both the majority logic and signum combiners is about same, the signum combiner may result in a very significant overall power efficiency improvement. For example, with a 60% conversion efficiency of the HPA, the overall efficiency of the sigma combiner may be 54% (0.9 0.6 100%) compared to 43.5% for the majority logic combiner. These advantages may be obtained with about 1 dB reduction in the signal power $P_s$. However, as shown in the following, the signal power $P_s$ can be increased at the cost of a nominal reduction in the SDR which still remains relatively high.

In addition to the mathematical analysis presented, the performance of a signum combiner was also obtained utilizing a computer simulation developed in the MATLAB software package available from THE MATHWORKS. According to the simulation, a signum combiner with an output given by Equation (2) above was input with M random codes of length 8192. The amplitudes of the signal terms, denoted by $a_1$ were obtained by correlating the combiner output with the various input codes. Fifty simulations were run. Table 8 illustrates the averages of the amplitudes for various codes over the fifty simulations.

TABLE 8

Coefficients of the various signal components at the
signum combiner output

| M | Signal coefficients (V) |
|---|---|
| 4 | 0.375 0.374 0.375 0.376 |
| 6 | 0.312 0.311 0.313 0.312 0.314 0.312 |
| 8 | 0.272 0.274 0.277 0.273 0.272 0.272 0.273 0.275 |
| 10 | 0.247 0.243 0.245 0.247 0.247 0.245 0.246 0.248 0.244 0.246 |

Table 9 shows the overall performance in terms of combiner power loss $P_L$ and the signal to distortion power ratio γ.

TABLE 9

Performance of the Signum Combiner by Simulations

| M | $P_s$ (W) | $P_t$ (W) | $P_L$ (dB) | γ (dB) |
|---|---|---|---|---|
| 4 | 0.56 | 0.62 | 0.46 | 9.51 |
| 6 | 0.59 | 0.6879 | 0.68 | 7.65 |
| 8 | 0.60 | 0.73 | 0.83 | 6.78 |
| 10 | 0.60 | 0.75 | 0.95 | 6.12 |
| 12 | 0.61 | 0.77 | 1.02 | 5.77 |
| 16 | 0.61 | 0.80 | 1.15 | 5.20 |
| 32 | 0.63 | 0.86 | 1.35 | 4.36 |
| 64 | 0.63 | 0.90 | 1.52 | 3.76 |

Comparing the results of tables 6 and 8 shows that the signal amplitude estimate obtained by simulation is very close to that predicted by theory. Similarly the comparison of the Tables 7 and 9 show that the results in terms of combiner power loss $P_L$ and the signal to distortion power ratio γ obtained by theory and simulations are very close.

The various signum code combiners described herein may be implemented by any suitable hardware and/or software combination. Also, for example, different architectures may utilize signum combiners in different ways. For example, FIG. 1 illustrates one embodiment of an architecture 100 for utilizing a cascaded set of signum combiners to combine code groups of differing power. According to various embodiments, the architecture 100 and generalized versions thereof may be referred to as successive signal insertion signum combiners. In the embodiment illustrated by the architecture 100, three code groups are received: $CG_1$, $CG_2$, $CG_3$. Codes within a common group may have the same power level. Also, for code $CG_1$ may have the highest power, with $CG_2$ having a power less than or equal that of $CG_1$ and $CG_3$ having a power less than or equal to $CG_2$. Each of the code groups $CG_1$, $CG_2$, $CG_3$ may be provided as input to respective signum combiners 102, 104, 106. The output of the signum combiner 102 corresponding to the highest power code group ($CG_1$) may be provided as input to a logic converter 108. The output of the logic converter 108 may provide a magnitude of its input. For example, if the output of the signum combiner 102 is equal to +1 or −1, the output of the logic converter 108 may be 1. If the output of the signum combiner 102 is equal to 0, then the output of the logic converter 108 may be 0. The output of the logic converter 108 may be provided to the inhibit input of a tri-state gate 110, whose input is connected to the output of the signum combiner 104 corresponding to the next highest power code group ($CG_2$). Accordingly, the output of the tri-state gate 110 may be equal to zero when the signum combination of the $CG_1$ codes is equal to +1 or −1 and may be equal to the signum combination of the $CG_2$ codes when the signum combination of the $CG_1$ codes is equal to zero.

An additional signum combiner 112 may receive as input a signal 112a that is the output of the signum combiner 102, corresponding to $CG_1$, and a signal 112b that is the output of the tri-state gate 110. The output of the signum combiner 112 may be provided to a logic converter 114, which may operate in a manner similar to that of converter 108. The output of the logic converter may be provided to a tri-state gate 116. The input of the tri-state gate 116 may be the output of the signum combiner 106 corresponding to the next highest power code group ($CG_3$). An additional signum combiner 118 may receive as input a signal 118a corresponding to the output of the combination of the $CG_1$ and $CG_2$ codes (e.g., the output of the signum combiner 112). In addition, the combiner 118 may receive an input 118b that may be equal to 0 when the combination of $CG_1$ and $CG_2$ is equal to +1 or −1 and may be equal to the combination of $CG_3$ when the combination of $CG_1$ and $CG_2$ is equal to zero. The output of the combiner 118 may be the output of the architecture 100.

The cascaded architecture 100 illustrated in FIG. 1 may be expanded for an arbitrary number of code groups $CG_i$ where i=1 to N. The power of each code group $CG_i$ may decrease as i increases. The number of codes in each code group $CG_i$ may be given by $M_i$. In the general case, each code group would be initially combined by a signum combiner, such as the combiners 102, 104, 106 of the architecture 100. Code group $CG_1$ may be combined with code group $CG_2$ utilizing the logic converter and tri-state gate logic shown in the architecture 100. The combination of groups $CG_1$ and $CG_2$ may then be combined with the code group $CG_3$, also using the logic converter and tri-state gate logic shown in the architecture 100. This pattern may continue until all of the code groups $CG_i$ where i=1 to N are combined. For example, the combination of groups $CG_1$ through $CG_{i-1}$ may be combined with the group $CG_i$ until all code groups (i=1 to N) are combined. Table 10 below shows the theoretical performance of successive signal insertion signum combiners for different numbers of code groups (N) having different numbers of signals (M).

TABLE 10

Successive Signal Insertion Combiner Performance

| M | N | $M_1$ | $M_2$ | $M_3$ | $P_s$(W) | $P_t$(W) | $P_L$(dB) | γ(dB) | $α_1$(V) | $α_2$(V) | $α_3$(V) |
|---|---|---|---|---|---|---|---|---|---|---|---|
| 8 | 2 | 4 | 4 |   | 0.64 | 0.86 | 1.27 | 4.69 | 0.375 | 0.140 |   |
| 6 | 2 | 2 | 4 |   | 0.64 | 0.81 | 1.03 | 5.72 | 0.500 | 0.188 |   |
| 6 | 2 | 4 | 2 |   | 0.63 | 0.81 | 1.09 | 5.45 | 0.375 | 0.186 |   |
| 8 | 3 | 4 | 2 | 2 | 0.65 | 0.91 | 1.42 | 4.10 | 0.375 | 0.187 | 0.094 |

In Table 10, $α_i$ denotes the amplitude of the codes in the code group i for i=1, 2, ..., N. Comparison with the case of equal power (Table 9) shows some increase in signal power $P_s$ and a reduction in the signal to distortion ratio (SDR).

Figure 2:
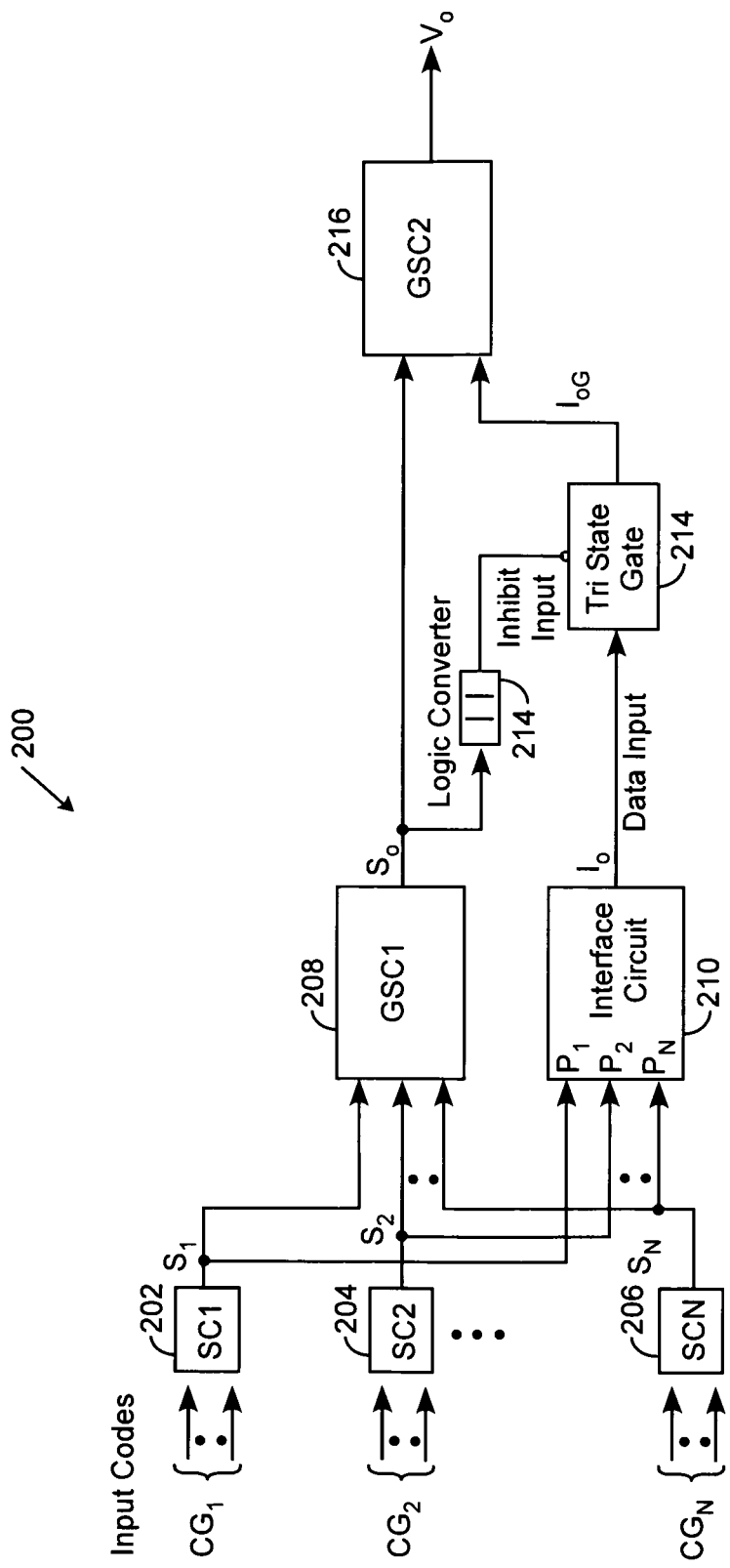
FIG. 2 illustrates a block diagram of one embodiment of a signum combiner with interlacing.

FIG. 2 illustrates a block diagram of one embodiment of a signum combiner 200 with interlacing. The example combiner 200 is configured to receive as input N groups of codes ($CG_i$ where i=1 to N). According to various embodiments, the codes within each group $CG_i$ may have equal power. Each group $CG_i$ may be combined at a first level signum combiner (e.g., 202, 204, 206) generating outputs $s_1, s_2, \ldots, s_N$. These outputs are, in turn, combined by a signum combiner 208 generating an output $s_0$. The outputs $s_1, s_2, \ldots, s_N$ may also be input to an interlace circuit 210. The interlace circuit, at each discrete time instance, may select one of its inputs in a random manner with respective probabilities $p_1, p_2, \ldots, p_N$ and makes its output equal to the input selected in this manner. The probabilities $p_1, p_2, \ldots, p_N$ of the interlace circuit 210 may or may not be the same and, according to various embodiments, need not be non-zero and their sum may be smaller than 1. The output $s_0$ of the combiner 208 may be converted to a two-level output by a logic converter 212. An output of the logic converter 212 may be provided to the inhibit input of a tri-state gate 214. The other input of the tri-state gate 214 may be provided to the output $i_0$ of the interlace circuit 210. Thus the output of the tri-state gate 214 may be equal to $i_0$ when $s_0$ is zero and may be equal to zero otherwise. The output $i_{0G}$ of the tri-state gate 214 may be combined with $s_0$ by the signum combiner 216, providing output $v_0$.

Table 11 shows the performance of the combiner 200 shown in FIG. 2 for an example with M=6, N=2, $M_1$=4 and $M_2$=2 with $α_1$ and $α_2$ denoting the amplitude of the Group 1 and Group 2 signals, respectively.

TABLE 11

Performance of Signum Combiner with Interlacing
(M = 6, N = 2, $M_1$ = 4, $M_2$ = 2)

| $p_1$ | $p_2$ | $P_s$(W) | $P_t$(W) | $P_L$(dB) | γ(dB) | $α_1$(V) | $α_2$(V) |
|---|---|---|---|---|---|---|---|
| 0 | 0 | 0.55 | 0.66 | 0.75 | 7.24 | 0.281 | 0.343 |
| 0.5 | 0 | 0.57 | 0.73 | 1.09 | 5.42 | 0.327 | 0.263 |
| 0.8 | 0 | 0.61 | 0.78 | 1.11 | 5.35 | 0.357 | 0.214 |
| 1 | 0 | 0.63 | 0.81 | 1.08 | 5.46 | 0.375 | 0.187 |
| 0 | 0.5 | 0.58 | 0.73 | 1.04 | 5.65 | 0.236 | 0.421 |
| 0 | 0.8 | 0.61 | 0.78 | 1.07 | 5.53 | 0.207 | 0.469 |
| 0 | 1 | 0.64 | 0.81 | 1.03 | 5.72 | 0.189 | 0.499 |

As may be inferred from Table 11, for a wide range of power distribution (e.g., power ratio among signals of up to 8.4 dB) between the two groups of signals, the SDR may lie between about 5.5 dB and 7.2 dB. Also, it can be seen that the result of the last row of Table 11 is very close to the result obtained by the successive insertion signum combiner 100 for the case $M_1$=2 and $M_2$=4 (e.g., two strong and four weak signals). For the case of equal power among M=6 signals, the SDR may be 7.65 dB from Table 9. This shows a penalty in SDR of up to about 2 dB depending upon the desired power ratio. The worst case power loss $P_L$ for the combiner 200 shown in FIG. 11 may be about 1.1 dB. Except for the first two rows of Table 11, however, the total signal power $P_s$ is higher than for the case of equal power allocation among the M signals.

According to various embodiments, it may be desirable to combine codes while assigning different weights to different codes. For example, for codes $c_1, c_2, \ldots, c_n$, a weighted coefficients signum combiner output may be given by (23):

$$v0 = \mathrm{sgn}(β_1 c_1 + β_2 c_2 + \ldots + β_n c_n) \tag{23}$$

Figure 3:
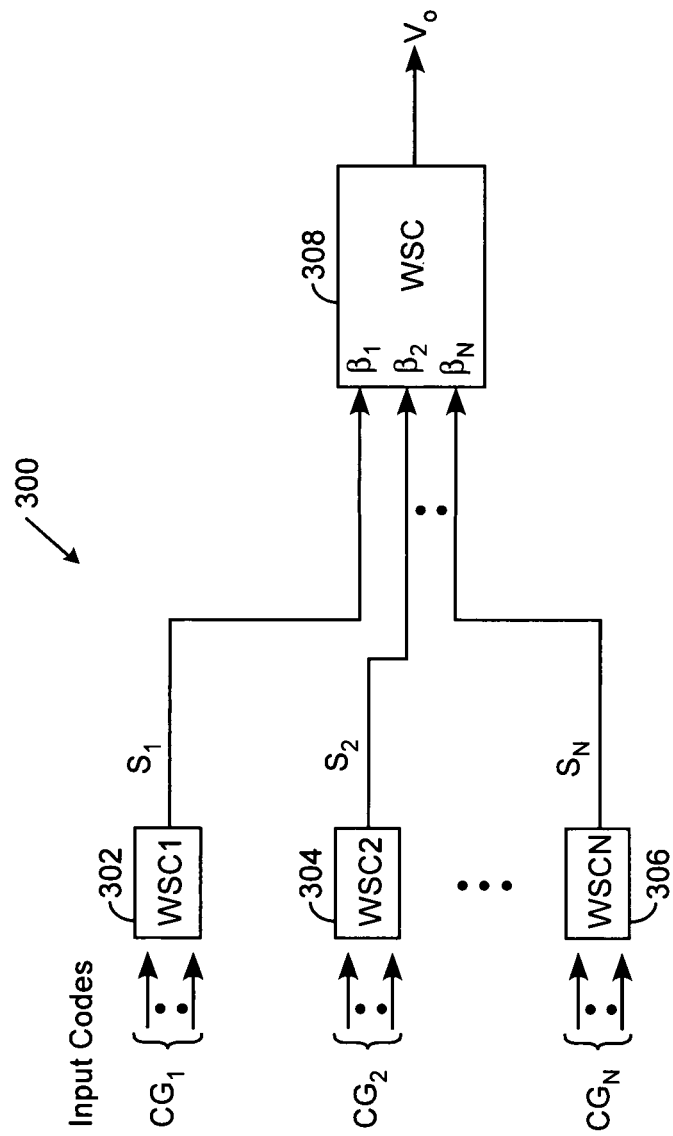
FIG. 3 illustrates a block diagram of one embodiment of a two-stage weighted coefficients signum combiner.

In (23), $β_1, β_2, β_n$ may be the combiner weighting coefficients. FIG. 3 illustrates a block diagram of one embodiment of a two-stage weighted coefficients signum combiner 300. The combiner 300 may receive as input a set of code groups $CG_i$ where i=1 to N. Each group of signals $CG_i$ may be combined by first-stage combiners 302, 304, 306 to generate outputs $s_i$ for i=1 to N. The outputs $s_1, s_2, \ldots, s_N$ may be input to the second stage weighted signum combiner 308, which may generate an overall output $v_O$. Each input to the combiner 308 may be scaled by a weighting factor $\beta_i$. According to various embodiments, the first stage combiners 302, 304, 306 may also weight or scale different codes from the respective code groups $CG_i$ differently.

Table 12 shows the performance of the two stage weighted coefficients signum combiner, with N=2 and the number of signals in the two groups equal to $M_1=4$, $M_2=2$. The first stage combiners 302, 304, 306 may have all of their weights equal to 1 with the combiner weights of the second stage combiner 308 given by $\beta_1$ and $\beta_2$.

TABLE 12

Performance of Weighted Coefficients Signum Combiner
(M = 6, N = 2, $M_1$ = 4, $M_2$ = 2)

| $\beta_1$ | $\beta_2$ | $P_s$(W) | $P_t$(W) | $P_L$(dB) | $\gamma$(dB) | $\alpha_1$(V) | $\alpha_2$(V) |
|---|---|---|---|---|---|---|---|
| 2 | 3 | 0.64 | 0.81 | 1.03 | 5.71 | 0.188 | 0.499 |
| 1 | 1 | 0.55 | 0.66 | 0.74 | 7.29 | 0.280 | 0.340 |
| 3 | 2 | 0.63 | 0.81 | 1.08 | 5.47 | 0.375 | 0.188 |

As can be seen from Table 12, the power of the $CG_1$ codes relative to the $CG_2$ codes may vary between −8.5 dB and 6.0 dB for the range of coefficients $\beta_1$ and $\beta_2$ shown in the table. The SDR may lie between 5.5 dB and 7.3 dB for this range of variation.

Figure 4:
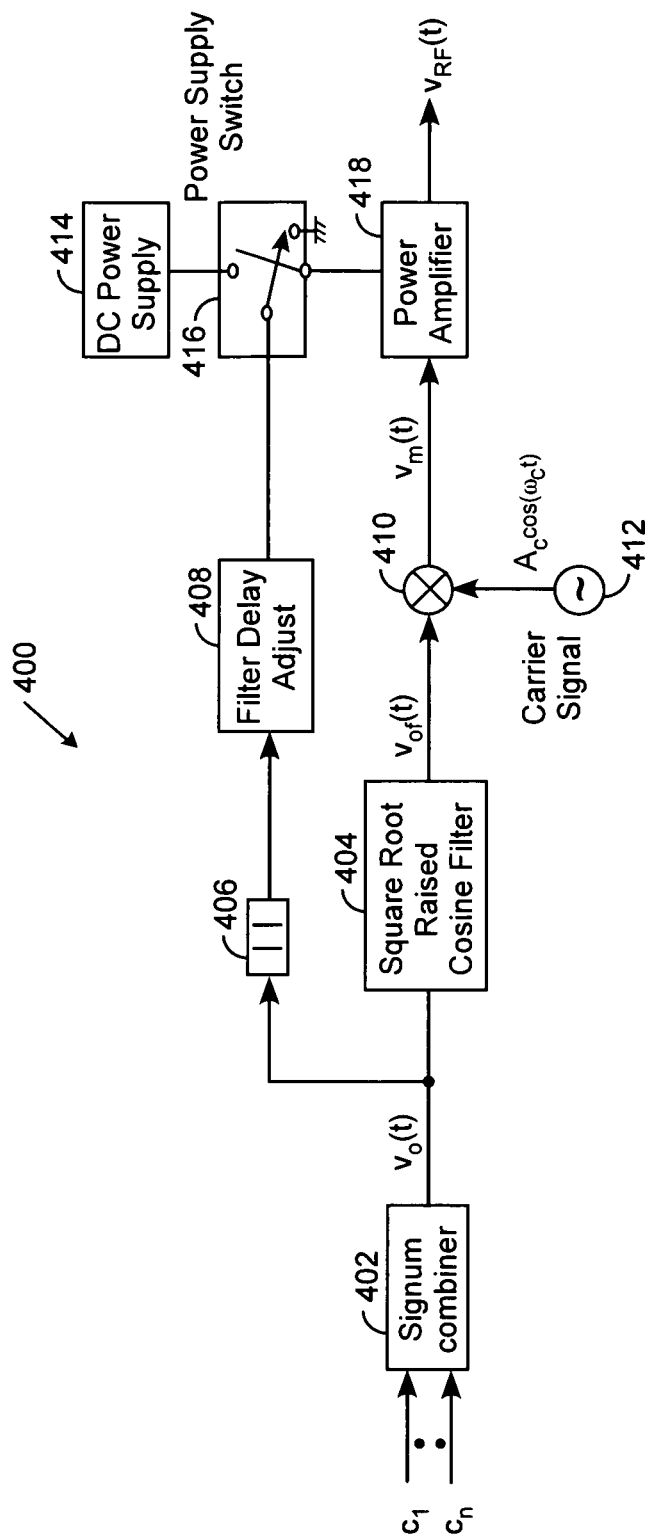
FIG. 4 illustrates a block diagram of one embodiment of a binary phase shift keying (BPSK) modulator for modulating the output of a signum combiner.

It will be appreciated that modulating the output of a signum combiner may be different than modulating the output of a majority logic or other code combiner, at least because the output of the signum combiner has three possible states (e.g., −1, +1 and 0) as compared to the typical two states (−1, +1). According to various embodiments, however, the output of a signum combiner may be modulated according to any suitable modulation scheme. For example, FIG. 4 illustrates a block diagram of one embodiment of a binary phase shift keying (BPSK) modulator 400 for modulating the output of a signum combiner. A signum combiner 402 may combine a series of codes $c_i$, for i=1 to n. The combiner 402 may be any suitable type of signum combiner including, for example, a successive insertion signum combiner, such as 100, an interlaced signum combiner, such as 200, or one or multiple stage weighted coefficients signum combiner, such as 300.

The output $v_0(t)$ of the combiner 402 may be may be input to a square-root raised cosine filter 404 for band limiting. The resulting band limited signal $v_{of}(t)$ may be input to a BPSK modulator 410, which may modulate the band limited signal $v_{of}(t)$ with a carrier signal 412 to generate a modulated signal $v_m(t)$ output. The output $v_0(t)$ of the signum combiner may also be input to a three-to-two level logic converter 406. The output of the logic converter 406 may be 1 if the input is non-zero and 0 otherwise. The output of the logic converter 406 may be provided to a delay adjust 408 with a delay equal to that introduced by the filter 404. The output of the delay adjust may be provided to a switch 416 which may control the DC voltage (provided by supply 414) to a power amplifier 418. When the logic converter output is 1 (e.g., when $v_0(t)$ is −1 or 1), the switch 416 may be closed, allowing the amplifier 418 to amplify the modulated signal $v_m(t)$, resulting in the transmission of an RF signal, $v_{RF}(t)$. When the logic converter output is zero (e.g., when $v_0(t)$ is 0), the switch 416 may be open, preventing amplification of the modulated signal $v_m(t)$ and, therefore, also preventing transmission. It will be appreciated that the power supply switch 416 may lead to some small distortion as it may block any signal caused by adjacent symbols during the period when the signum combiner output is zero. Nonetheless, the overall system may provide increased power efficiency, as set forth above.

According to various embodiments the band limiting filter 404 and power supply switch 416 may be omitted. When the filter 404 is omitted, the output $v_m(t)$ of the modulator 410 may be zero when the combiner 402 output $v_0(t)$ is also zero. For some power amplifiers 418, such as class B and class C amplifiers, there may be no conduction and, therefore, no transmission when the input is equal to zero. Accordingly, in embodiments where the filter 404 is omitted the power supply switch 416 may not be necessary.

Figure 5:
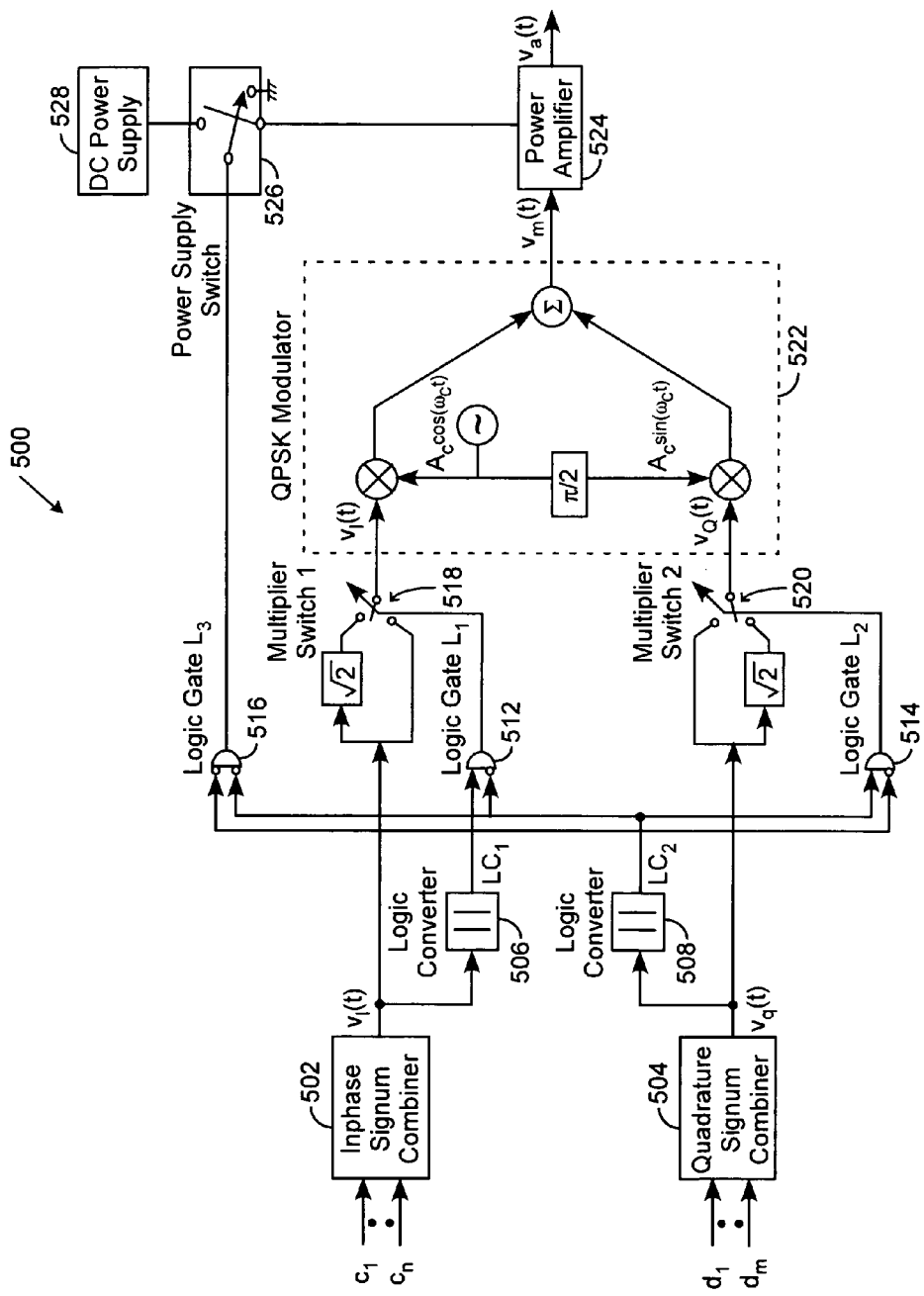
FIG. 5 shows a block diagram of one embodiment of a quadrature phase shift keying (PQSK) modulator.

FIG. 5 shows a block diagram of one embodiment of a quadrature phase shift keying (PQSK) modulator 500. The input to the modulator 500 may comprise a set of in-phase codes $c_i$ for i=1 to n, and a set of quadrature codes $d_i$ for i=1 to m. The in-phase codes $c_i$ may be combined at an in-phase signum combiner 502, which may be any suitable type of signum combiner including, for example, any one of the combiners 100, 200, 300 described herein. The result may be an in-phase combined signal $v_i(t)$. Similarly, the quadrature codes $d_i$ may be combined at quadrature combiner 504 to generate output $v_q(t)$. According to various embodiments, the quadrature combiner 504 and the in-phase combiner 502 may be of the same type. Also, it will be appreciated that the number of in-phase modulation n may not be equal to the number of quadrature modulation codes m.

The output $v_i(t)$ of the in-phase combiner 502 may be provided to a logic converter 506 having an output $LC_1$ equal to 1 if the input is nonzero and equal to zero otherwise. Similarly, the quadruature signum combiner 504 output $v_q(t)$ may be input to the logic converter 508 having an output $LC_2$ equal to 1 if the input is nonzero and equal to zero otherwise. The logic converter outputs $LC_1$ and $LC_2$ may be input to logic gates 512, 514, 516 generating outputs $L_1$, $L_2$ and $L_3$, respectively. $L_1$ may be 1 if and only if $LC_1$ is equal to 1 and $LC_2$ is equal to zero. $L_3$ may be equal to 1 if and only if both of the inputs $LC_1$ and $LC_2$ are equal to zero. Similarly, $L_2$ may be equal to 1 if $LC_1$ is equal to zero and $LC_2$ is equal to 1. The logic outputs $L_1$, $L_2$ and $L_3$ may all equal zero if both $LC_1$ and $LC_2$ are equal to one.

The logic output $L_1$ may be provided to and may control a multiplier switch 518. The multiplier switch 518 may provide an output $v_I(t)$ that is equal to $v_i(t)$ when $L_1$ is zero and is equal to the inphase combiner output $v_i(t)$ multiplied by $\sqrt{2}$ if $L_1$ is 1. Accordingly, when $v_i(t)$ is non zero and $v_q(t)$ is zero, the combiner output $v_i(t)$ may be multiplied by $\sqrt{2}$. Similarly a multiplier switch 520 may generate an output $v_Q(t)$ that is equal to $v_q(t)$ when $L_2$ is zero and equal to $v_q(t)$ multiplied by $\sqrt{2}$ when $v_q(t)$ is nonzero and $v_i(t)$ is zero (e.g., when $L_2$ is equal to one).

The outputs $v_I(t)$, $v_Q(t)$ of the multiplier switches 518, 520 may be input to the QPSK modulator 522, generating the QPSK modulated signal $v_m(t)$ at the modulator output. The QPSK modulated signal $v_m(t)$ may be input to the power amplifier 524, generating the amplified signal $v_a(t)$. When both the inphase and quadrature signum combiner outputs $v_i(t)$ and $v_q(t)$ are zero, the logic output $L_3$ is 1 and the power supply switch 526 is turned to the ground position, disconnecting the DC power supply 528 from the power amplifier 524. Thus no DC power is supplied to the amplifier during the period when both $v_i(t)$ and $v_q(t)$ are zero resulting in zero output at the QPSK modulator output and ensuring high DC to AC power conversion efficiency. For the usual class B and C amplifier designs, there is no conduction with the amplifier input equal to 0 and thus the power supply switch may not be required. Again, when class B and/or C amplifier designs are used for the power amplifier 524, there may not be any conduction when the input $v_m(t)$ is equal to zero, and this the power supply switch 526 may be omitted.

The multiplication of the signum combiner outputs $v_i(t)$ and $v_q(t)$ by $\sqrt{2}$ in a manner described herein may ensure that the QPSK modulated signal $v_m(t)$ is a constant envelope signal when the dc power supply is ON and is zero otherwise. This may maximize the DC to RF power conversion efficiency of the power amplifier 524. Such a multiplication by $\sqrt{2}$ may also result in a further improvement in terms of the transmitted signal power $P_s$. For example, with n=4 codes at the input of the in-phase combiner 502 and m=4 codes at the input of the quadrature combiner 504, the coefficients of the various code components present in the signal $v_i(t)$ are equal to 0.433 compared to 0.375 for the signum combiner without such modification as given by Table 6. Multiplication by $\sqrt{2}$ does not result in any increase in the peak envelope power at the amplifier input which is equal to $A_c\sqrt{2}$ with or without the multiplication by $\sqrt{2}$. The corresponding power levels are $P_s$=0.7534 W and $P_t$=0.8599 W as compared to $P_s$=0.5625 W and $P_t$=0.625 W from Table 6. The signal-to-noise ratio γ is equal to 8.50 dB compared to 9.54 dB thus resulting in about 1 dB degradation. However, the increase in the signal power $P_s$ by 1.27 dB is desirable as the signal-to-noise ratio γ equal to 8.50 dB is relatively high especially compared to the traditional majority logic combiner with γ equal to 4.77 dB and 3.74 dB for the number of codes equal to three and four respectively as per the results of Table 5.

It is to be understood that the figures and descriptions of the present invention have been simplified to illustrate elements that are relevant for a clear understanding of the present invention, while eliminating other elements, for purposes of clarity. Those of ordinary skill in the art will recognize that these and other elements may be desirable. However, because such elements are well known in the art and because they do not facilitate a better understanding of the present invention, a discussion of such elements is not provided herein.

In general, it will be apparent to one of ordinary skill in the art that at least some of the embodiments described herein may be implemented in many different embodiments of software, firmware, and/or hardware. The software and firmware code may be executed by a computer or computing device comprising a processor (e.g., a DSP or any other similar processing circuit), for example, the computing device 600 described below. The processor may be in communication with memory or another computer readable medium comprising the software code. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. According to various embodiments, the software may be firmware stored at an EEPROM and/or other non-volatile memory associated a DSP or other similar processing circuit. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Figure 6:
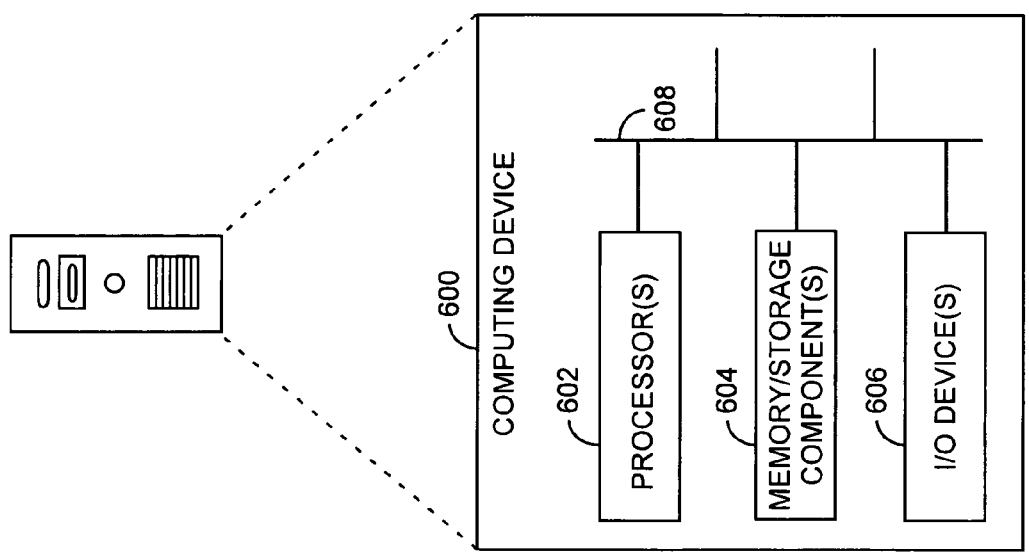
FIG. 6 shows one embodiment of an example computing device.

FIG. 6 shows an example of a computing device 600 according to one embodiment. For the sake of clarity, the computing device 600 is illustrated and described here in the context of a single computing device. However, it is to be appreciated and understood that any number of suitably configured computing devices can be used to implement a described embodiment. For example, in at least some implementations, multiple communicatively linked computing devices may be used. One or more of these devices can be communicatively linked in any suitable way such as via one or more networks. One or more networks can include, without limitation: the Internet, one or more local area networks (LANs), one or more wide area networks (WANs) or any combination thereof.

In the example of FIG. 6, the computing device 600 comprises one or more processor circuits or processing units 602, one or more memory circuits and/or storage circuit component(s) 604 and one or more input/output (I/O) circuit devices 606. Additionally, the computing device 600 comprises a bus 608 that allows the various circuit components and devices to communicate with one another. The bus 608 represents one or more of any of several types of bus structures, including a memory bus or memory controller, a peripheral bus, an accelerated graphics port, and a processor or local bus using any of a variety of bus architectures. The bus 608 may comprise wired and/or wireless buses. The processing unit 602 may be responsible for executing various software programs such as system programs, applications programs, and/or program modules/blocks to provide computing and processing operations for the computing device 600. The processing unit 602 may be responsible for performing various voice and data communications operations for the computing device 600 such as transmitting and receiving voice and data information over one or more wired or wireless communications channels. Although the processing unit 602 of the computing device 600 is shown in the context of a single processor architecture, it may be appreciated that the computing device 600 may use any suitable processor architecture and/or any suitable number of processors in accordance with the described embodiments. In one embodiment, the processing unit 602 may be implemented using a single integrated processor.

The processing unit 602 may be implemented as a host central processing unit (CPU) using any suitable processor circuit or logic device (circuit), such as a as a general purpose processor. The processing unit 602 also may be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the processing unit 602 may be coupled to the memory and/or storage component(s) 604 through the bus 608. The bus 608 may comprise any suitable interface and/or bus architecture for allowing the processing unit 602 to access the memory and/or storage component(s) 604. Although the memory and/or storage component(s) 604 may be shown as being separate from the processing unit 602 for purposes of illustration, it is worthy to note that in various embodiments some portion or the entire memory and/or storage component(s) 604 may be included on the same integrated circuit as the processing unit 602. Alternatively, some portion or the entire memory and/or storage component(s) 604 may be disposed on an integrated circuit or other medium (e.g., hard disk drive) external to the integrated circuit of the processing unit 602. In various embodiments, the computing device 600 may comprise an expansion slot to support a multimedia and/or memory card, for example. The memory and/or storage component(s) 604 represent one or more computer-readable media. The memory and/or storage component(s) 604 may be implemented using any computer-readable media capable of storing data such as volatile or non-volatile memory, removable or non-removable memory, erasable or non-erasable memory, writeable or re-writeable memory, and so forth. The memory and/or storage component(s) 604 may comprise volatile media (e.g., random access memory (RAM)) and/or nonvolatile media (e.g., read only memory (ROM), Flash memory, optical disks, magnetic disks and the like). The memory and/or storage component(s) 604 may comprise fixed media (e.g., RAM, ROM, a fixed hard drive, etc.) as well as removable media (e.g., a Flash memory drive, a removable hard drive, an optical disk). Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The one or more I/O devices 606 allow a user to enter commands and information to the computing device 600, and also allow information to be presented to the user and/or other components or devices. Examples of input devices include data ports, digital-to-analog converters (DAC's), analog to digital converters (ADC's), a keyboard, a cursor control device (e.g., a mouse), a microphone, a scanner and the like. Examples of output devices include data ports, DACs, ADCs, a display device (e.g., a monitor or projector, speakers, a printer, a network card). The computing device 600 may comprise an alphanumeric keypad coupled to the processing unit 602. The keypad may comprise, for example, a QWERTY key layout and an integrated number dial pad. The computing device 600 may comprise a display coupled to the processing unit 602. The display may comprise any suitable visual interface for displaying content to a user of the computing device 600. In one embodiment, for example, the display may be implemented by a liquid crystal display (LCD) such as a touch-sensitive color (e.g., 76-bit color) thin-film transistor (TFT) LCD screen. The touch-sensitive LCD may be used with a stylus and/or a handwriting recognizer program.

The processing unit 602 may be arranged to provide processing or computing resources to the computing device 600. For example, the processing unit 602 may be responsible for executing various software programs including system programs such as operating system (OS) and application programs. System programs generally may assist in the running of the computing device 600 and may be directly responsible for controlling, integrating, and managing the individual hardware components of the computer system. The OS may be implemented, for example, as a Microsoft® Windows OS, Symbian OS™, Embedix OS, Linux OS, Binary Run-time Environment for Wireless (BREW) OS, JavaOS, or other suitable OS in accordance with the described embodiments. The computing device 600 may comprise other system programs such as device drivers, programming tools, utility programs, software libraries, application programming interfaces (APIs), and so forth.

In various embodiments disclosed herein, a single component may be replaced by multiple components and multiple components may be replaced by a single component to perform a given function or functions. Except where such substitution would not be operative, such substitution is within the intended scope of the embodiments.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

I claim:

1. A method for combining a plurality of binary Code Division Multiple Access (CDMA) codes, the method comprising:
receiving by a first computer device a plurality of codes, wherein the plurality of codes are binary CDMA codes having possible logical values of −1 or +1, wherein the plurality of codes comprises an even number of codes, and wherein the first computer device comprises at least one processor and operatively associated memory; and
generating, by the first computer device, a first output based on a sum of the plurality of codes, wherein the generating comprises:
determining, by the first computer device, a sum of the plurality of codes wherein, depending on logical values of the plurality of codes, the sum is one of: greater than zero, less than zero, or equal to zero; and
determining, by the first computer device, a signum of the sum of the plurality of codes, wherein the first output is equal to the signum of the sum of the plurality of codes, and wherein, depending on the sum of the plurality of codes, the signum of the plurality of codes takes one of the following conditional values:
1, in the case where the sum of the plurality of codes is greater than zero;
−1, in the case where the sum of the plurality of codes is less than zero; and
0, in the case where the sum of the plurality of codes is equal to zero;
modulating the first output onto a carrier signal to generate a modulated signal; and
generating a transmit signal, wherein the transmit signal is equal to an amplified representation of the modulated signal when the first output is non-zero and wherein the transmit signal is equal to zero when the first output is zero.

2. The method of claim 1, further comprising:
receiving at the first computer device a second plurality of codes, wherein the second plurality of codes are binary codes having possible logical values of −1 and +1, wherein the second plurality of codes comprises an even number of codes; and
generating a second output by the first computer device, wherein the second output is equal to the a signum of a sum of the second plurality of codes.

3. The method of claim 2, wherein a power level of the first plurality of codes is higher than a power level of the second plurality of codes, the method further comprising:
generating an intermediate output by the first computer device, wherein the intermediate output is equal to the second output when the first output is equal to 0, and wherein the intermediate output is equal to 0 when the first output is equal to +1 or −1 generating a third output by the first computer device, wherein the third output is equal to the a signum of a sum of:
the first output; and
the intermediate output.

4. The method of claim 3, further comprising:
receiving at the first computer device a third plurality of codes, wherein the third plurality of codes are binary codes having possible logical values of −1 and +1, wherein the third plurality of codes comprises an even number of codes;
generating a fourth output by the first computer device, wherein the fourth output is equal to the signum of a sum of the third plurality of codes;
generating a second intermediate output by the first computer device, wherein the second intermediate output is equal to the fourth output when the third output is equal to 0, and wherein the second intermediate output is equal to 0 when the first output is equal to +1 or −1;
generating a fifth output by the first computer device, wherein the fifth output is equal to the signum of a sum of:
the third output; and
the second intermediate output.

5. The method of claim 2, further comprising:
generating by the first computer device, a third output, wherein the third output is equal to the a signum of a sum of:
the first output; and
the second output.

6. The method of claim 5, further comprising scaling the first output by a first weighting factor and scaling the second output by a second weighting factor before generating the third output.

7. The method of claim 5, further comprising:
interlacing the first output and the second output to generate an interlace output;
generating a modified interlace output, wherein the modified interlace output is equal to the interlace output when the third output is equal to 0, and wherein the modified interlace output is equal to zero when the third output is equal to +1 or −1; and
generating a fourth output, wherein the fourth output is equal to the signum of the sum of the third output and the modified interlace output.

8. The method of claim 1, further comprising:
filtering the first output by the first computer device.

9. A system for combining a plurality of binary Code Division Multiple Access (CDMA) codes, the system comprising:
a first combiner circuit configured to:
receive a plurality of codes, wherein the plurality of codes are binary CDMA codes having possible logical values of −1 or +1, wherein a number of codes in the plurality of codes is even; and
generate a first output based on a sum of the plurality of codes, wherein the first output is equal to a signum of the sum of the plurality of codes, wherein generating the first output comprises:
determining a sum of the plurality of codes wherein, depending on logical values of the plurality of codes, the sum is one of: greater than zero, less than zero, or equal to zero; and
determining a signum of the sum of the plurality of codes, wherein the first output is equal to the signum of the sum of the plurality of codes, and wherein, depending on the sum of the plurality of codes, the signum of the sum of the plurality of codes takes the following conditional values:
1, in the case where the sum of the plurality of codes is greater than zero;
−1, in the case where the sum of the plurality of codes is less than zero; and
0, in the case where the sum of the plurality of codes is equal to zero;
a modulator configured to modulate the first output onto a carrier signal to generate a modulated signal;
a non-linear power amplifier; and
a power supply switch connected to receive the first output, wherein the power supply switch is configured to assume a closed position connecting the power amplifier to a power supply when the first output is non-zero and also configured to assume an open position disconnecting the power amplifier from the power supply when the first output is zero.

10. The system of claim 9, further comprising
a second combiner configured to generate a second output, wherein the second output is equal to the signum of the sum of a second plurality of codes, wherein the second plurality of codes are binary codes having possible logical values of −1 and +1, and wherein the second plurality of codes comprises an even number of codes.

11. The system of 10, wherein a power level of the second plurality of codes is lower than the power level of the first plurality of codes, and further comprising:
a logic converter configured to receive the first output and generate a logic converter output having a first value when the first output is non-zero and a second value when the first output is zero;
a logic gate configured to receive the second output and the logic converter output and generate a logic gate output equal to the second output when the first output is equal to 0 and equal to 0 when the first output is non-zero; and
a third combiner configured to receive the first output and the logic gate output and generate a third output equal to the signum of the sum of the first output and the logic gate output.

12. The system of claim 10, further comprising:
a fourth combiner configured to receive a third plurality of codes, wherein the third plurality of codes are binary codes having possible logical values of −1 and +1, wherein the third plurality of codes comprises an even number of codes, and wherein the fourth combiner is configured to generate a fourth combiner output equal to the signum of the sum of the third plurality of codes;
a second logic converter configured to receive the third output and generate a second logic converter output having a first value when the first output is non-zero and a second value when the first output is zero;
a second logic gate configured to receive the fourth output and the second logic converter output and generate a logic gate output equal to the fourth output when the third output is equal to 0 and equal to 0 when the first output is non-zero; and
a fifth combiner configured to receive the third output and the second logic gate output and generate a fifth output, wherein the fifth output is equal to the signum of the sum of the third output and the second intermediate output.

13. The system of claim 10, further comprising:

a third combiner configured to receive the first output and the second output and generate a third output, wherein the third output is equal to the signum of the sum of the first output and the second output.

14. The system of claim 13, wherein the third combiner is also configured to scale the first output by a first weighting factor and scale the second output by a second weighting factor before generating the third output.

15. The system of claim 10, further comprising:

an interlacing circuit configured to interlace the first output and the second output to generate an interlace output;

a logic converter configured to receive the third output and generate a logic converter output having a first value when the third output is non-zero and a second value when the third output is zero;

a logic gate configured to receive the interlace output and the logic converter output and generate a logic gate output equal to the interlace output when the first output is equal to 0 and equal to 0 when the first output is non-zero; and a fourth combiner configured to receive the third output and the logic gate output and generate a fourth output equal to the signum of the sum of the third output and the logic gate output.

16. The system of claim 9, further comprising:

a square-root raised filter configured to filter the first output.

17. The system of claim 9, wherein the power amplifier is designed according to a design selected from the group consisting of a Class B design and a Class C design.

18. The system of claim 10, wherein the plurality of codes represent in-phase components and the second plurality of codes represent quadrature components, and wherein the computer device is further programmed to implement:

a first multiplier switch configured to generate a first multiplier switch output equal to the first output multiplied by $\sqrt{2}$ when the first output is equal to one and the second output is equal to 0 and equal to the first output otherwise;

a second multiplier switch configured to generate a second multiplier switch output equal to the second output multiplied by $\sqrt{2}$ when the second output is equal to one and the first output is equal to zero and equal to the second output otherwise;

a quadrature phase shift keying (QPSK) modulator configured to receive the first and second multiplier switch outputs and generate a modulated signal output.

19. The system of claim 18, wherein the power supply switch is also configured to assume an open position disconnecting the power amplifier from the power supply when the first output and the second output are zero.

* * * * *